J. H. PATTEE.
Cultivators.
No. 6,080.
Reissued Oct. 6, 1874.
Fig. 6.
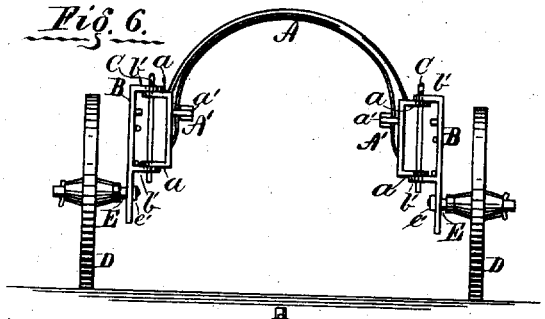
Fig. 5.
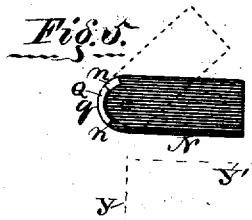
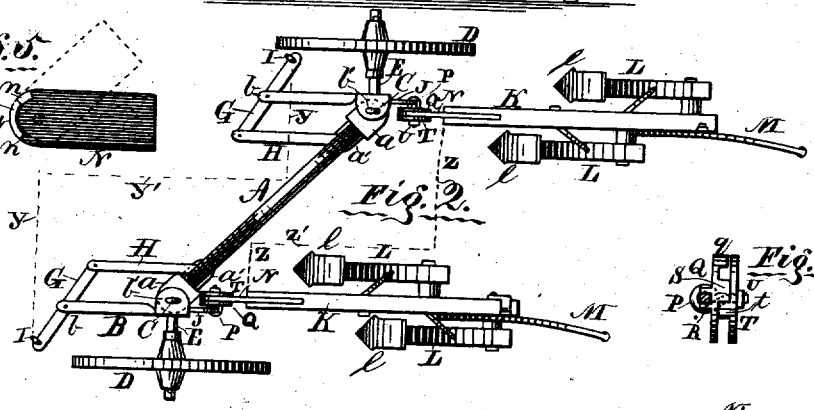
Fig. 2.
Fig. 4.
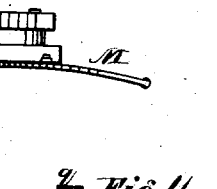
Fig. 1.
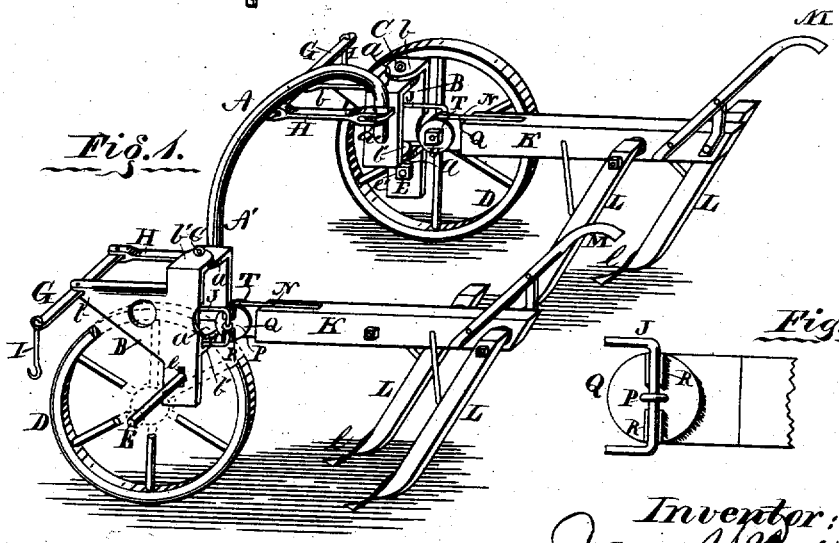
Fig. 3.
Witnesses:
M. H. Baringer
J. J. Tunnecliff
Inventor:
James H. Pattee, By
R. M. Hallum & W. B. Richards,
Atty's.
THE NORRIS PETERS CO., PHOTO-LITHO., WASHINGTON, D. C.

UNITED STATES PATENT OFFICE.

JAMES H. PATTEE, OF MONMOUTH, ILLINOIS, ASSIGNOR TO HIMSELF, HENRY H. PATTEE, AND ITHAMER P. PILLSBURY.

IMPROVEMENT IN CULTIVATORS.

Specification forming part of Letters Patent No. 124,218, dated March 5, 1872; reissue No. 6,080, dated October 6, 1874; application filed July 22, 1874.

*To all whom it may concern:*

Be it known that I, JAMES H. PATTEE, of Monmouth, county of Warren and State of Illinois, have invented certain Improvements in Cultivators, of which the following is a specification:

This invention relates to improvements in straddle-row cultivators or implements for cultivating both sides of a row of growing plants simultaneously; and the invention consists, first, in the combination of an elevated axle supported on wheels with two plow-beams carrying plows and handles and independently hinged or pivoted to the axle, so as to be retained in working position without rear connection or support and move freely in a lateral, vertical, and longitudinal direction; second, it consists in hinging the ends of the axle to plates, to which the draft-animals are attached, and which are supported on wheels in such manner that the wheels are retained in the line of progression of the machine by the draft of the animals, and may either one be advanced forward of the other, throwing the axle diagonal with the line of progression, while the wheels preserve the same relative position to the said line of progression; third, it consists in the combination of draft-plates with the wheels, constructed and arranged to support said wheels; fourth, it consists in the combination of plow-beams, carrying plows and handles, with an axle, to which the supporting-wheels are pivoted; fifth, it consists in a new combination of devices whereby the axle is retained in an elevated or upright position and the beams steady in working position; sixth, it consists in the arrangement of a hitching device with the draft-plates, which allow the draft-animals to advance or recede, the one ahead or in rear of the other, without influencing the plow-beams to the extent of the variation made by the said animals, all as hereinafter fully described.

To enable others skilled in the art to make and use my invention, I will now proceed to describe the same with reference to the accompanying drawing, in which—

Figure 1 is a perspective view of a machine embodying my invention. Fig. 2 is a top plan or view of Fig. 1. Fig. 3 is a side elevation of the joint by which the beams are hinged to the axle. Fig. 4 is a top view of the same joint with the beam-plate removed. Fig. 5 is a side view of the beam-plate and the plate it rests against. Fig. 6 is a rear side elevation of the axle and the draft-plate.

Referring to the parts by letters, letter A represents the axle, formed as shown in the drawings, of an elevated central part, A, vertical side portions A′ A′, and horizontal projections *a a*, from each of the vertical side portions A′. B B are draft-plates, with projecting forward ends *b*, to which the draft-animals may be attached direct or by any suitable device, and with an enlarged rear end, from which project lugs *b′ b′*, corresponding with the projections *a a* of the axle A, to which they are hinged by vertical bolts C, as plainly shown in the drawings. D D are the supporting-wheels. E E are the wheel-spindles, their inner ends shouldered, threaded, and secured in slots *e* in the lower ends of the plates B by nuts *e′*. G G are eveners, pivoted near their centers in the forward ends of the plates B. H H are bars, their forward ends pivoted to the inner ends of the eveners G G, and their rearward ends pivoted to lugs *a′ a′*, which project inwardly from the vertical parts A′ of the axle. I I are hooks on the outer ends of the eveners G G, to which the draft-animals are attached. J J are bars, round in their cross-section, their central portions vertical, and their ends bent forward at right angles thereto, and are attached to the rear sides of the plates B. K K are the plow-beams. L L L L are the standards, and *l l l l* the shovels. M M are the handles, same as in ordinary cultivators. N N are the beam-plates, one to each beam, their rear ends attached to the beams K K, their forward ends projecting therefrom and formed as hereinafter described. P P are hook-bolts, their hooked ends encircling the vertical parts of the bars J J. Q Q are circular plates, pierced with holes through which the shanks of the hook-bolts P pass. R R R R are lugs on the plates Q, with semicircular grooves on their faces next the bars J J, resting against said bars and holding the plates Q Q in a vertical position when pressed thereto. *q q* are segmental annular flanges on the outer edge of plates Q Q, which work in segmental annular recesses *n n* on the outer ends of the beam-plates N N. S S are segmental annular flanges projecting from the face of the plates Q Q, around the central holes through the same, forming fulcrums on which the beam-plates N N operate to allow the beams K K free vertical movement or oscillation without resting directly on the shanks of the bolts P P. T T are washers, pierced with holes, through which the bolts P P pass, and having segmental annular flanges *t t* on their faces next the beam-plates N N, which flanges fit into the recesses in the flanges S S and prevent the washers being turned by the frequent vertical movement of the plow-beams. U U are nuts on the outer ends of the bolts P P.

The operation is as follows: The axle is raised and lowered relatively to the wheels D D by adjusting the spindles E E in the slots *e e*. The axle A is held in working position, nearly vertical, by the segmental flanges *q q* on the plates Q Q engaging with the ends of the recesses *n n* in the beam-plates N N, while at the same time the recesses *n n* are a sufficient amount longer than the flanges *q q* to allow the beams the necessary amount of vertical movement for practical purposes.

It will be evident that the draft-plates B support and give direction to the course of the wheels, while the wheels in turn serve to support them.

At Fig. 2 it is plainly shown that either plow may be advanced forward of the other, and at the same time the beams be kept parallel, and the wheels D D neither inclined to the right or left, the wheel-spindles E E retaining their positions at right angles to the wheel-faces, to the line of progression, and to the plow-beams, each horse drawing his own plow in a great degree independent of the other, either end of the axle A advancing or falling back, turning on the pivotal bolts C.

The dotted lines Y Y and Z Z at Fig. 2 show plainly by their relative distances apart that the beams K K are not advanced, the one ahead of the other, as much as the draft-animals advance, the one ahead of its fellow, the distance of the lines Y Y apart showing the variations of the draft-animals, and the distance of the lines Z Z apart showing the variation of the beams.

What I claim as new, and desire to secure by Letters Patent, is—

1. The combination, in a walking straddle-row cultivator, of the following instrumentalities, viz., two wheels, D D, axle A, and two plow-beams, K K, each beam carrying a handle and one or more shovels or plows, and independently hinged to the axle, so as to be retained in working position without rear connection or support, and move freely in a lateral, vertical, and longitudinal direction, substantially as and for the purpose specified.

2. The axle A, hinged to the wheel-spindle or draft-plates B B, so that the wheels are retained in the line of progression by the draft of the animals, when one is in advance of the other, substantially as described, and for the purpose specified.

3. In combination with wheel D, draft-plate B, operating to support and give direction to the wheel, substantially as and for the purpose specified.

4. The combination of the plow-beams K K, axle A, and wheels D D, the latter being hinged or pivoted to the axle to permit of one side moving in advance of the other, substantially as described, and for the purpose specified.

5. The hinged axle A, sustained in an upright or vertical position by means of the plow-beams K K and their shovels or plows and the joint-pieces which connect the beams to the axle, substantially as and for the purpose set forth.

6. The evener-bars G and bars H, combined and arranged to operate with the hinged axle A, plates B, and wheels D, substantially as and for the purpose specified.

JAMES H. PATTEE.

Witnesses:
W. B. RICHARDS,
ISAAC MARKS.